United States Patent [19]

Corrigan

[11] E Patent Number: Re. 33,067

[45] Reissued Date of Patent: Sep. 26, 1989

[54] FRESH PRODUCE PRESERVATION

[76] Inventor: John E. Corrigan, c/o Corrigan Corporation, 1430 Paddock Dr., Northbrook, Ill. 60062

[21] Appl. No.: 184,192

[22] Filed: Apr. 20, 1988

Related U.S. Patent Documents

Reissue of:

[64] Patent No.: 4,179,900
Issued: Dec. 25, 1979
Appl. No.: 860,175
Filed: Dec. 13, 1977

U.S. Applications:

[63] Continuation-in-part of Ser. No. 704,362, Jul. 12, 1976, abandoned.

[51] Int. Cl.[4] ..... F25B 19/00

[52] U.S. Cl. ..... 62/231; 62/247; 62/309; 239/11

[58] Field of Search ..... 62/231, 247, 309, 64, 62/78, 91; 239/11

[56] References Cited

U.S. PATENT DOCUMENTS

| | | | |
|---|---|---|---|
| Re. 19,973 | 5/1936 | Forman | 62/64 |
| 1,778,141 | 10/1930 | Birdsong et al. | 62/247 |
| 1,827,175 | 10/1931 | Taylor | 312/115 |
| 1,889,499 | 11/1932 | Rorrer | 62/64 |
| 1,950,204 | 3/1934 | Wood et al. | 62/247 |
| 1,987,796 | 1/1935 | Rorrer | 312/117 |
| 2,011,731 | 8/1935 | Rorrer | 62/120 |
| 2,025,063 | 12/1935 | Lopesinger | 239/498 |
| 2,065,358 | 12/1936 | Zarotschenzeff | 62/91 |
| 2,066,312 | 1/1937 | Bales | 62/247 |
| 2,097,530 | 11/1937 | Peddicord | 62/247 |
| 2,279,521 | 4/1942 | Peterson | 211/127 |
| 2,305,435 | 12/1942 | McAffee | 211/127 |
| 2,492,308 | 12/1949 | Menges | 62/91 |
| 2,531,506 | 11/1950 | Geneck | 62/247 |
| 2,533,913 | 12/1950 | Booth | 62/157 |
| 2,625,806 | 1/1953 | Kennedy | 62/247 |
| 3,708,119 | 1/1973 | Vicard | 239/11 |
| 3,788,542 | 1/1974 | Mee | 239/11 |

*Primary Examiner*—Ronald C. Capossela
*Attorney, Agent, or Firm*—Wood, Dalton, Phillips, Mason & Rowe

[57] ABSTRACT

A system of preserving fresh produce in a refrigerator displayed for observation and selection by the public, such as in a grocery store. Moisture is applied to the articles, in the form of an extremely fine mist, made up of particles in the range of about 75–150 micron diameter, suspended in air, and slowly falling. The moisture applied to the produce articles is only film-thick so as to minimize flow-off from the articles. Producing the mist includes selectively, hydraulic pressure means, or air pressure means. The mist is controlled by automatic on-off control means and is produced by misting nozzles centrally positioned above the shelf means for supporting various produce articles within the refrigerator display means.

6 Claims, 2 Drawing Sheets

FRESH PRODUCE PRESERVATION

Matter enclosed in heavy brackets [ ] appears in the original patent but forms no part of this reissue specification; matter printed in italics indicates the additions made by reissue.

This application is a continuation-in-part of my copending application Ser. No. 704,362, filed July 12, 1976, now abandoned.

FIELD OF THE INVENTION

The invention resides in the broad field of preserving fresh produce, such as garden vegetables, the produce articles being displayed to view and access to the public for sale, such as in a grocery store. The articles are usually displayed in a refrigerator with an open top for access to the articles by the purchasers. Such a refrigerator is usually cooled by means of a circulating stream of cool air.

OBJECTS OF THE INVENTION

A broad object of the invention is to provide a novel method of and apparatus for preserving harvested fresh produce, such as in a grocery store, in better condition for a longer time than has been possible heretofore.

A more specific object of the invention is to provide a method of and apparatus for:

(a) applying moisture in an extremely fine mist made up of correspondingly fine particles, to the produce articles;

(b) so applying the moisture in an extremely thin film so that there will be a minimum of flow-off from the articles;

(c) so applying the moisture to the articles in a pattern of periodic time intervals, in which the off-time of the mist is much greater than the on-time so that the purchaser may take advantage of the greater off-time for her comfort in selecting articles without fear of becoming wet from the mist, and further wherein the on-time is so short that the customer can readily observe that the on-time is of short duration, and then easily select the articles and withdraw them during the off-time;

(d) providing a novel arrangement of nozzles in an overlapping effect as between adjacent nozzles so as to effectively completely cover the articles with a moisture film;

(e) producing a much superior appearance of the articles;

(f) having a nozzle of such structure as to produce a fine mist and directing such mist to all portions of the produce articles, more effectively than has been possible heretofore.

Another object is to provide a method and apparatus of the foregoing character which utilizes water that is originally cold, such as that supplied by a community water supply, thereby to realize greater economy in the operation of preserving the produce, in that such cold water itself produces a refrigerating effect on the articles, separate and apart from other refrigerating steps hereto taken in cooling refrigerators.

DESCRIPTION OF A PREFERRED EMBODIMENT

In the drawings

Referring to the overall method in produce preservation, the produce articles or vegetables, after being harvested require great care to preserve them in good condition for substantial periods, and even in edible condition and good-appearance condition for any appreciable length of time. Fresh fruits and vegetables are considered as being alive and breathing, carrying on processes similar to those of other living things. The most important of these are respiration and dehydration which result in decomposition and loss of flavor and are, consequently, to be retarded.

Refrigeration has been the most practical way of retarding that respiration and has of course long been used for that purpose. Another important factor in the preservation of produce is the retardation of dehydration. Most articles of produce naturally contain a very high percentage of moisture, and the lesser the moisture saturation of the surrounding air, the greater is the loss of moisture from the produce, and consequent deterioration. Generally speaking, the desired cooling effect heretofore could be achieved, but the maintenance of the desired humidity in connection therewith was extremely difficult and in almost all occasions was not achieved.

As various steps in the development or evolution of preservation of produce, the first one was simple cooling; a further step was wrapping the individual articles for retaining a greater amount of natural moisture therein and in that way preserving them better than before; however, such wrapped articles resulted in considerable rotting thereof and to overcome that disadvantage, many times the wrappers were perforated, to enabling breathing, but it failed to completely overcome the disadvantages of rotting; still later, spraying the produce was resorted to, but this has a limited preserving effect on the articles because of the lack of the advantages referred to above in connection with the present method.

Another disadvantage in the methods of preserving heretofore utilized is that the appearance of the produce articles was not as good as desired, it being universally agreed that the appearance of produce articles plays a great part in attracting customers to buying them. The method and apparatus of the present invention are unusually effective for producing the good appearance of the articles, as will be brought out more fully hereinbelow.

Figure 1:
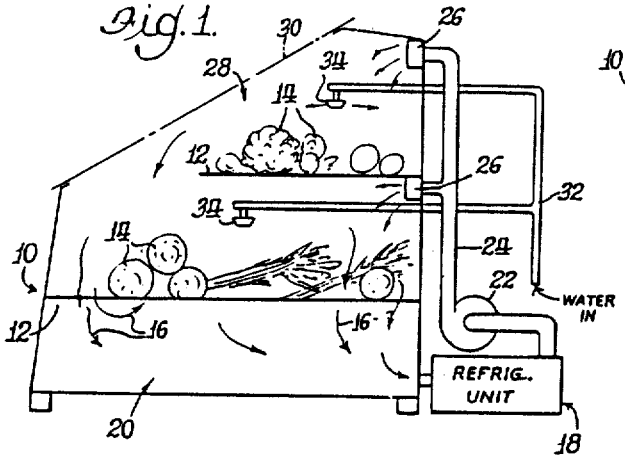
FIG. 1 is a vertical transverse sectional view of a refrigerated cabinet, somewhat diagrammatic in nature, with the apparatus of the invention applied thereto.

FIG. 1 shows a refrigerator cabinet 10 of known kind and in quite general use. This illustration is somewhat diagrammatic in nature, having one or more shelves 12 for supporting the articles of produce 14 which may be of any and all kinds, beans, lettuce, melons, etc. Preferably the shelves are perforated to enable circulated cooling air to pass therethrough as indicated by the arrows 16.

While the present invention is directed particularly to application of moisture to the articles, with the inventive system being adaptable to display cabinets of known kind presently existing. Such display cabinets ordinarily are refrigerated and a customary refrigerating system is illustrated in FIG. 1 where refrigeration is provided by a suitable means indicated generally at 18, including a pump 22 circulating cooled air through conduit means 24, through outlets 26 into the general space 28 of the cabinet from which it returns, as indicated by the arrows 16 referred to above. In this manner a stream of relatively cool air is set up, and maintained substantially entirely within the main space of the cabinet by means of the location of the outlets 26 and the apertures in the shelves. The air so circulated is prevented from escape, at least to any great extent, through the open front of the cabinet represented by the dot-dash line 30, which is provided for retrieval of the articles by the customers.

Figure 2:
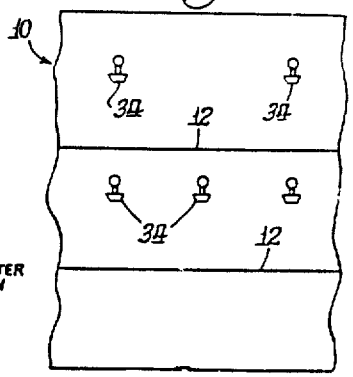
FIG. 2 is a front view, from the left, of a portion of the cabinet of FIG. 1.
Figure 7:
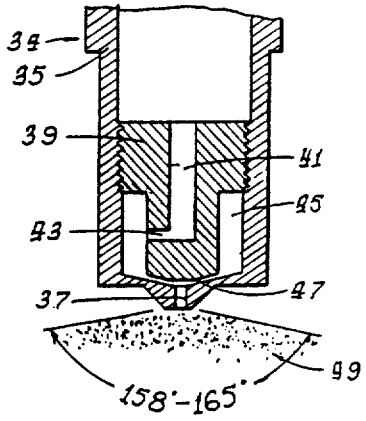
FIG. 7 is a view of the internal construction of a preferred form of nozzle used in the invention and indicating the kind of spray produced thereby.
Figure 8:
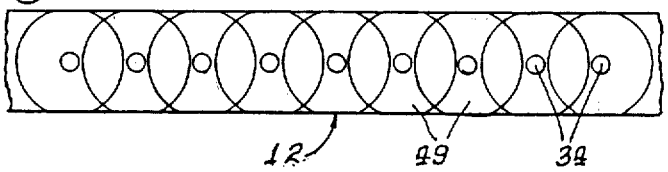
FIG. 8 is a diagrammatic plan view of an arrangement of nozzles indicating the overlapping effect of the sprays produced by adjacent nozzles.

FIG. 1 also includes a water supply and control means particularly adapted to incorporation of the apparatus of the invention. In FIG. 1, a water supply means includes an inlet pipe 32 terminating in nozzles 34. A preferred form of nozzle utilized in the invention is illustrated in FIG. 7 and described hereinbelow. Also the nozzles 34 are specially positioned as brought out hereinbelow, and as illustrated in FIGS. 2 and 8.

As shown in FIG. 7, one of the plurality of nozzles 34 utilized with the system of the invention includes a housing 35 having an end aperture 37. A plug 39 is threaded into the housing and has a central axial bore 41 leading from the upper part of the housing downwardly through a plurality (one shown) of radial bores 43 leading into an annular space 45 between a reduced portion of the plug and the wall of the housing. An end space 47 is provided between the end surfaces of the plug and the housing. This space is of extremely fine dimension, is conical in shape, and leads from the annular space 45 to the aperture 37. This type of plug is well-known and this type or a similar type may be provided so long as the spray produced is of sufficient fineness and distributed in a suitable pattern, both of which are referred to again hereinbelow. Such a spray is indicated at 49, and is distributed over a wide area, its upper limits being preferably in the range of up to 165°. This range in the case of the nozzle 34 may be for example between 158° and 165° also as indicated in FIG. 7.

The nozzles are positioned centrally of the produce articles, from front to rear (FIG. 1), and distributed [laterally] *longitudinally*, along the length of the cabinet, according to the area occupied by the produce articles. It is also desired to have them so spaced on any given shelf as to provide an overlapping effect of the sprays of the adjacent nozzles. This is represented in FIG. 8 and this feature will be referred to again hereinbelow.

Figure 3:
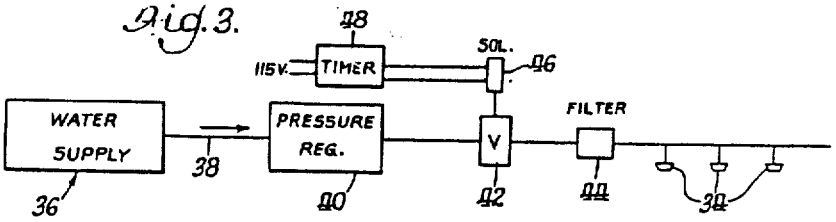
FIG. 3 is a diagram of a water supply circuit utilized in of the invention.

Preferably tap water is utilized, such as supplied from a community water supply, such supply usually providing sufficient pressure for the present purposes, and being of relatively low temperature. Such an arrangement is shown in FIG. 3 which includes a water supply 36 from which a line 38 continues to a suitable pressure regulator or pump 40, then through a control valve 42, and a filter 44, to the nozzles 34. The valve 42 is controlled by the solenoid 46 which in turn is controlled by a timer 48 utilized for intermittently controlling the supply of water as referred to again hereinbelow.

A typical pressure at which community water is supplied is 40 psi. Pressure as low as 30 psi is practical, and the mist or spray produced by the nozzle of FIG. 7 under a pressure of 30 psi produces particles of in the neighborhood of 150 microns diameter. It is found that a pressure of lower than 30 psi will not produce a mist and is not practical. Community water is often supplied at higher pressures, such for example of in the neighborhood of 80 psi and at such pressure, the mist particle size may be in the neighborhood of 75 microns diameter, it being understood that the greater the pressure of the water supplied, the smaller is the partical size. Water pressures of as great as 150 psi are often supplied, either by a community water supply, or an individual water supply, and at this pressure this mist particles are of still smaller size, e.g., at or below 50 microns. No practical maximum pressure limit need to considered.

A mist made up of particles of the sizes referred to is readily suspended in air for a relatively long period of time. Therefore they do not drop immediately, but are spread over quite a wide area from the action of the nozzle itself, and due to their suspension tend to spread over a greater area.

The nozzles being spaced apart as stated, and shown in FIG. 8, the mists overlap as between adjacent nozzles and thus assure a high degree of coverage by a film. These spray or mist areas need not completely overlap, but they do so to a substantial extent, and an advantage is that side portions of areas of produce articles, relative to the position of any one nozzle, which difficult for the mist to reach, as compared with those portions directly under the nozzle are in fact reached with the mist. The present arrangement results in the movement of the mist particles laterally so that those from any one nozzle will tend to more effectively cover side portions of adjacent areas under other nozzles.

Figure 4:
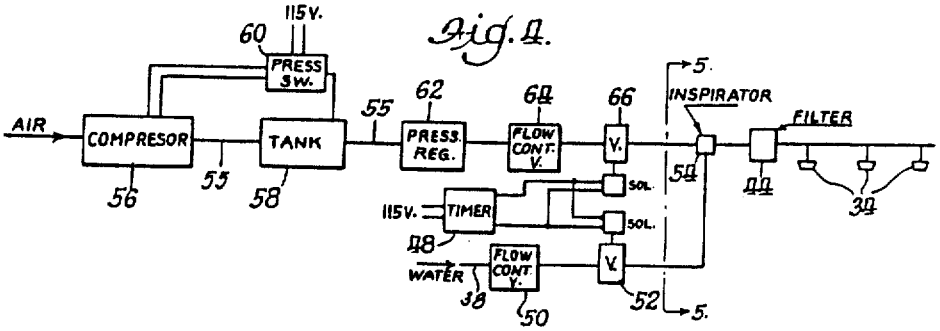
FIG. 4 is a diagram of a modified form of water supply circuit.

A water system as represented in FIG. 3 is preferred, namely, the pressure is of hydraulic nature, as compared with compressed air system. However, an air pressure arrangement may nevertheless be utilized as represented in FIG. 4. The water line 38 leads through a flow control valve 50, a shut-off valve 52, an inspirator 54, and then to the filter 44 and nozzles 34. The air is derived from a compressor 56 in an air line 55, the line 55 continuing to an air pressure tank 58. An air pressure switch 60 is responsive to the pressure in the tank 58 and thereby controls the operation of the compressor 56. The air line 55 then leads to a pressure regulator 62, a flow control valve 64, a shut-off valve 66 and then to the inspirator 54. Upon flow of the air through the inspirator, the water is drawn thereinto from the line 38 to the nozzles. The shut-off valves 66, 52, are controlled by the timer 48.

Figure 5:
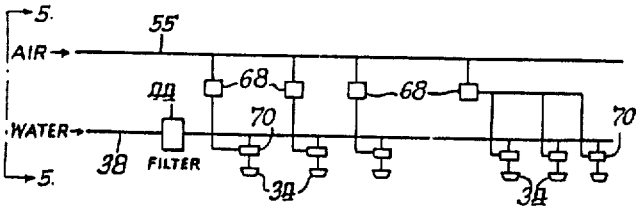
FIG. 5 is a diagram of another modified form of water supply circuit.

In the arrangement of FIG. 4 all of the nozzles 34 are controlled alike, under common control, but it is often desired to control the nozzles individually, or in smaller groups, according to locations of zones within the cabinet, and in the latter case an arrangement as shown in FIG. 5 may be utilized. The arrangement of FIG. 5 may replace the portion to the right of the section line 5—5 in FIG. 4. In the present case, the water line 38 leads to the nozzles 34, but the air line 55 leads to a plurality of control elements 68 and inspirators 70 individual to the nozzles 34. The control elements 68 can be individually controlled for correspondingly controlling the respective nozzles as in the left-hand portion of FIG. 5, but instead of having an inspirator for each individual nozzle, the arrangement of the right-hand portion of the circuit of FIG. 4 may be used, such that a single control element 68 controls a plurality or group of nozzles, such group being for example in a particular location or zone of the cabinet and which group may be regulated as a group in a manner similar to the individual nozzles in FIG. 4, thus insuring more efficient control, and economy in the cost of the apparatus.

Figure 6:
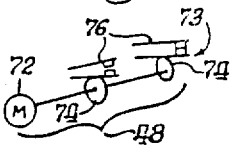
FIG. 6 is a diagrammatic illustration of timer means included in the inventive system.

FIG. 6 shows diagrammatically a timer arrangement including a motor 72 and a plurality of units 73, each unit including a cam 74 and corresponding switch 76. The cams are individually adjustable for on/off periods, and acting through the switches 76 for turning the nozzles on and off. These units 73 each may be associated with an individual nozzle, or a group of nozzles, and the cams being individually adjustable, the corresponding individual nozzles, or groups of nozzles, can be turned to respectively on and off position according to the desired flow of the spray or mist. The flow of water can be controlled with great flexibility through the intermittent on/off control, as well as capacity of the nozzles, according to the character of the produce articles as the latter require more or less moisture.

Because the fine mist particles float in the air, or are suspended for a substantial period of time, they tend to reach surfaces of the produce articles that are not completely exposed and would be covered only with difficulty in systems heretofore in use. For example the surfaces on the undesides of the articles, and those interfacing in spaces in a pile of articles, normally would not be so well covered in ordinary sprinkling, but in the present case the suspended particles more readily move into those areas and contact those surfaces.

Not only are the produce articles actually preserved in better condition, but their appearance is very much improved. The mist applied according to the present invention, including the particles of such small size mentioned, produces a most unusual appearance on the articles. The water as applied to the articles appears as a "spray of diamonds". It is most remarkable. Particles of the moisture or water stand out as sparkling particles and a very attractive effect results, drawing much more attention from the customers, and resulting in greater sales. The improved appearance also persists for a long time, as referred to above. For example, after several days many of the articles heretofore would appear wilted and discolored, such articles are correspondingly less appealing to the eye, but in the present instance there is almost always a film of water on the articles so that they appear much better than articles preserved in any other manner.

Figure 9:
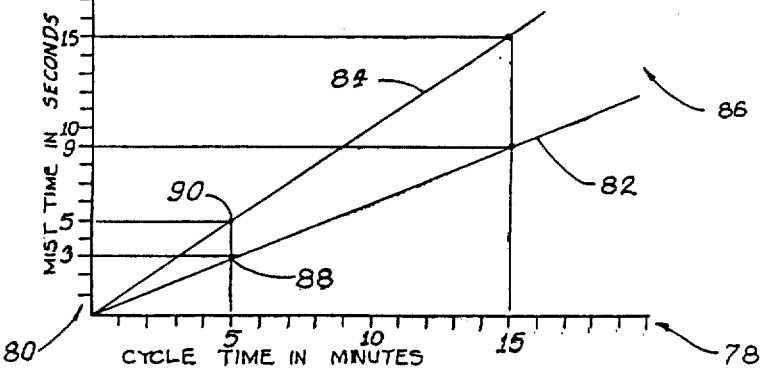
FIG. 9 is a graph indicating the relative on-time and off-time of the spray.

Another great advantage of the present invention results from the intermittent spray or mist. A preferred on/off pattern is represented in the graph of FIG. 9. In that graph abscissas 78 represent minutes and the ordinates 80 represent seconds. Such preferred on/off pattern is, out of a cycle or total of 5 minutes, the nozzle is turned on for a period of between 3 and 5 seconds, and turned off the remaining time. The curves 82, 84 define an area 86 therebetween representing range in which the nozzles may be on at any given overall period of time. In the example given above, at the 5 minute point in the abscissa 78, there are two points 88 and 90 in the curves 82, 84 respectively. While the on/off cycle is preferably 3 to 5 seconds on for each 5 minutes, it is possible to have instead, a cycle of 3 minutes for example, or 12 minutes, or 15 minutes, etc. Whatever that cycle is that is selected, the curves 82, 84 define an area 86 in which is represented seconds of on time for any given overall cycle, the on time being in the same proportion to the cycle, regardless of the length of the cycle.

If the cycle is too long, such as appreciably greater than 60 minutes, the articles may become too dry. On the other hand a cycle of less than 5 minutes is disadvantageous in that the off time may not be long enough to give a customer sufficient and convenient time to reach in and select the articles without having her hands sprayed. The 5 minute cycle is considered the optimum cycle.

An advantage of the relatively small on-time as compared with the overall cycle, such as in the preferred example given, namely, 3 to 5 seconds on in an overall 5 minute cycle, the on-time is so short that the customer is hardly aware that the produce is being misted. It will be understood that the on/off time is so calculated and proportioned that a film of water will be on the articles at all times without excessive drying, but also such film will not be sufficiently heavy to cause overwetting of the produce. Furthermore the film that is maintained on the articles is such that the articles can be handled without undue feeling of wetness in the hand.

Various produce articles are of such different characters that require different amounts of moisture in their preservation, as indicated above. The automatic control of the on-off cycling of the mist application may be so regulated as to apply different amounts of mist according those different characters.

Another great advantage of the invention is that it is automatic. Once the amount of timing of the spray is determined for particular produce articles, that degree of spraying is maintained and the particles are not subject to overlooking or forgetting as would be the case if manual sprinkling were relied on. Additionally manual sprinkling does not normally include a fine mist as in the present case.

A further advantage of the invention is the utilization of tap water. Tap water ordinarily is in the neighborhood of between 40° F. and 50° F. which is substantially cooler than room temperature and it aids in the actual refrigerating function, independently of the moisture provided. The cooling effect of the water is less costly than cooling with air alone for the same resulting cool temperature.

A still further advantage of the automatic feature is that a minimum amount of water is utilized because there is a minimum of run-off of the water from the articles, and the amount actually applied corresponds to great extent with the ambient conditions whether of temperature, moisture, or time of day, e.g., through the night as contrasted with during the shopping day. A still further advantage is that the display cabinet need not be covered at night in non-shopping hours, as has been the case heretofore. This results in a great economic advantage in the elimination of the labor required for this step.

I claim:

1. A system for preserving fresh produce within a refrigerator display means having an opening accessible to the public for inspection and selective removal of produce therefrom, comprising, in combination:

at least one fluid-permeable elongated shelf means having laterally spaced apart [side] *front and rear* edges for supporting fresh produce thereon;

means providing a stream of relatively cool air circulating about said shelf means;

a plurality of misting nozzle means centrally positioned from the [lateral side] *laterally spaced* edges of said shelf means and above said shelf means, said nozzle means being spaced from one another a select distance and along the length of said shelf means so that an atomized mist pattern from each nozzle means overlaps at least one adjacent atomized mist pattern;

a water supply and control means connected with said plurality of misting nozzle means for providing relatively cool water at a pressure of at least about 30 p.s.i. to said nozzle means; and a timer means operationally connected to said control means to intermittently provide pressurized water to said nozzle means for relatively brief periods of time and to intermittently shut-off pressurized water to said nozzle means for relatively long periods of time.

2. A system as defined in claim 1 wherein each of said nozzle means provide a mist pattern which extends about 158° to 165° [from] *about a line perpendicular to* a central axis of each such nozzle means.

3. A system as defined in claim 1 wherein said control means is a plurality of control means, each being connected to a [select] *preselected* nozzle means for control of water to such [select] *preselected* nozzle means only.

4. A system as defined in claim 1 wherein said timer means provides pressurized water to said nozzle means for about three to five seconds and shut-off pressurized water to said nozzle means for about [347] *297* to [345] *295* seconds.

*5. A system for preserving fresh produce within a refrigerator display means having an opening accessible to the public for inspection and selected removal of produce therefrom, comprising, in combination:*

*at least one fluid-permeable elongated shelf means having laterally spaced apart front and rear edges for supporting fresh produce thereon;*

*means providing a stream of relatively cool air circulating about said shelf means;*

*a plurality of misting nozzle means centrally positioned from the laterally spaced edges of said shelf means and above said shelf means, said nozzle means being spaced from one another a select distance and along the length of said shelf means so that an atomized mist pattern from each nozzle means overlaps at least one adjacent atomized mist pattern.*

*a water supply and control means connected with said plurality of misting nozzle means for providing relatively cool water at a pressure of about 30 p.s.i. to said nozzle means; and*

*a timer means defining a cycle time and operationally connected to said control means to intermittently provide pressurized water to said nozzle means for a preselected time in the range from 1 to 1⅔ percent of said cycle time and to intermittently shut-off pressurized water to said nozzle means for the remainder of said cycle time within each cycle.*

*6. The system as defined in claim 5 wherein said cycle time comprises a five minute cycle time.*

* * * * *